(12) United States Patent
Abe (10) Patent No.: US 10,690,899 B2
(45) Date of Patent: Jun. 23, 2020

(54) IMAGE OBSERVATION DEVICE AND MICROSCOPE SYSTEM

(71) Applicant: OLYMPUS CORPORATION, Tokyo (JP)

(72) Inventor: Yoko Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/285,513

(22) Filed: Feb. 26, 2019

(65) Prior Publication Data

US 2019/0196168 A1 Jun. 27, 2019

Related U.S. Application Data

(63) Continuation of application No. PCT/JP2016/075843, filed on Sep. 2, 2016.

(51) Int. Cl.
*G02B 21/24* (2006.01)
*G02B 21/36* (2006.01)
(Continued)

(52) U.S. Cl.
CPC ........... *G02B 21/244* (2013.01); *G02B 21/00* (2013.01); *G02B 21/006* (2013.01);
(Continued)

(58) Field of Classification Search
None
See application file for complete search history.

(56) References Cited

U.S. PATENT DOCUMENTS

2004/0264765 A1   12/2004   Ohba
2013/0088634 A1   4/2013   Kishima et al.
(Continued)

FOREIGN PATENT DOCUMENTS

EP   1515174 A2   3/2005
EP   2687890 A1   1/2014
(Continued)

OTHER PUBLICATIONS

International Search Report dated Oct. 11, 2016 issued in PCT/JP2016/075843.

*Primary Examiner* — Frederick D Bailey
(74) *Attorney, Agent, or Firm* — Scully, Scott, Murphy & Presser, P.C.

(57) ABSTRACT

An image observation device configured to: generate a reference image on a basis of one or more two-dimensional images of a Z-stack image constituted of two-dimensional images acquired by shifting a focal position; generate, on the generated reference image, a frame having window portions covering different small regions and superimposed on the reference image; allow a user to operate the generated frame; allocate different focal ranges to the respective window portions of the frame; generate, for the respective small regions covered by the respective window portions, omnifocal images by using, among the two-dimensional images in regions corresponding to the respective small regions, the two-dimensional images in the focal ranges allocated to the respective window portions; replace the regions of the reference image in the respective window portions with the respective generated omnifocal images based on the different focal ranges; and display the reference image, the frame, and the omnifocal images.

4 Claims, 10 Drawing Sheets

(51) Int. Cl.
*G02B 21/00* (2006.01)
*H04N 5/232* (2006.01)

(52) U.S. Cl.
CPC ........... *G02B 21/367* (2013.01); *H04N 5/232* (2013.01); *H04N 5/23212* (2013.01); *H04N 5/232133* (2018.08); *H04N 5/232933* (2018.08); *H04N 5/232945* (2018.08)

(56) References Cited

U.S. PATENT DOCUMENTS

| | | |
|---|---|---|
| 2013/0093872 A1 | 4/2013 | Kang |
| 2013/0155203 A1 | 6/2013 | Watanabe |
| 2014/0022346 A1 | 1/2014 | Liu et al. |
| 2014/0023283 A1 | 1/2014 | Liu et al. |
| 2014/0232844 A1* | 8/2014 | Wolff ................... G02B 21/006 348/79 |
| 2016/0063307 A1* | 3/2016 | Iwasa ................. G06K 9/00127 348/79 |
| 2017/0108686 A1* | 4/2017 | Chan ......................... G02B 7/38 |
| 2017/0237894 A1* | 8/2017 | Hikida ...................... G06T 7/13 348/79 |

FOREIGN PATENT DOCUMENTS

| | | |
|---|---|---|
| EP | 2687893 A1 | 1/2014 |
| JP | 2005-017557 A | 1/2005 |
| JP | 2013-080144 A | 5/2013 |
| JP | 2013-088530 A | 5/2013 |
| JP | 2013-134473 A | 7/2013 |
| JP | 2014-021489 A | 2/2014 |
| JP | 2014-029528 A1 | 2/2014 |
| WO | WO 2011/071505 A1 | 6/2011 |

\* cited by examiner

IMAGE OBSERVATION DEVICE AND MICROSCOPE SYSTEM

CROSS-REFERENCE TO RELATED APPLICATIONS

This is a continuation of International Application PCT/JP2016/075843, with an international filing date of Sep. 2, 2016, which is hereby incorporated by reference herein in its entirety.

TECHNICAL FIELD

The present invention relates to an image observation device and a microscope system.

BACKGROUND ART

It is known that, in a case in which an imaging object having a size of several millimeters is observed by using a microscope having a focal depth of several tens of micrometers, or in a case in which an imaging object having a depth in the optical-axis direction is observed, an omnifocal image, which is focused in substantially the entire region thereof, is generated by using a plurality of images (hereinafter referred to as the Z-stack image) captured while shifting the focal position in the optical-axis direction, and by combining pixels of images having maximum focusing degrees at individual pixel positions (for example, see Patent Literature 1).

In Patent Literature 1, in a case in which the focusing degree at each position has two or more peak values, these peak values are detected as a plurality of candidate values, and a plurality of omnifocal images are generated by utilizing a specific number of Z-stack images for each of the detected candidate values.

CITATION LIST

Patent Literature

{PTL 1} Japanese Unexamined Patent Application, Publication No. 2014-21489

SUMMARY OF INVENTION

An aspect of the present invention is an image observation device configured to: perform a reference-image generating that generates a reference image on a basis of one or more two-dimensional images of a Z-stack image constituted of the plurality of two-dimensional images that are acquired by shifting a focal position in an optical-axis direction of an objective lens; perform a frame generating that generates, on the generated reference image, a frame that has a plurality of window portions covering different small regions of the reference image and that is superimposed on the reference image; perform a frame operating that allows a user to operate the generated frame so as to be moved with respect to the reference image; perform a focal-range allocating that allocates different focal ranges to the respective window portions of the generated frame; perform an omnifocal-image generating that generates, for the respective small regions covered by the respective window portions, omnifocal images by using, among the two-dimensional images in regions corresponding to the respective small regions, the two-dimensional images in the focal ranges allocated to the respective window portions; perform an image replacing that replaces the regions of the reference image in the respective window portions with the respective generated omnifocal images that are based on the different focal ranges; and display the reference image, the frame, and the omnifocal images.

Another aspect of the present invention is a microscope system provided with: a microscope that acquires the Z-stack image; and the abovementioned image observation device.

DESCRIPTION OF EMBODIMENT

An image observation device 3 and a microscope system 1 according to an embodiment of the present invention will be described below with reference to the drawings.

Figure 1:
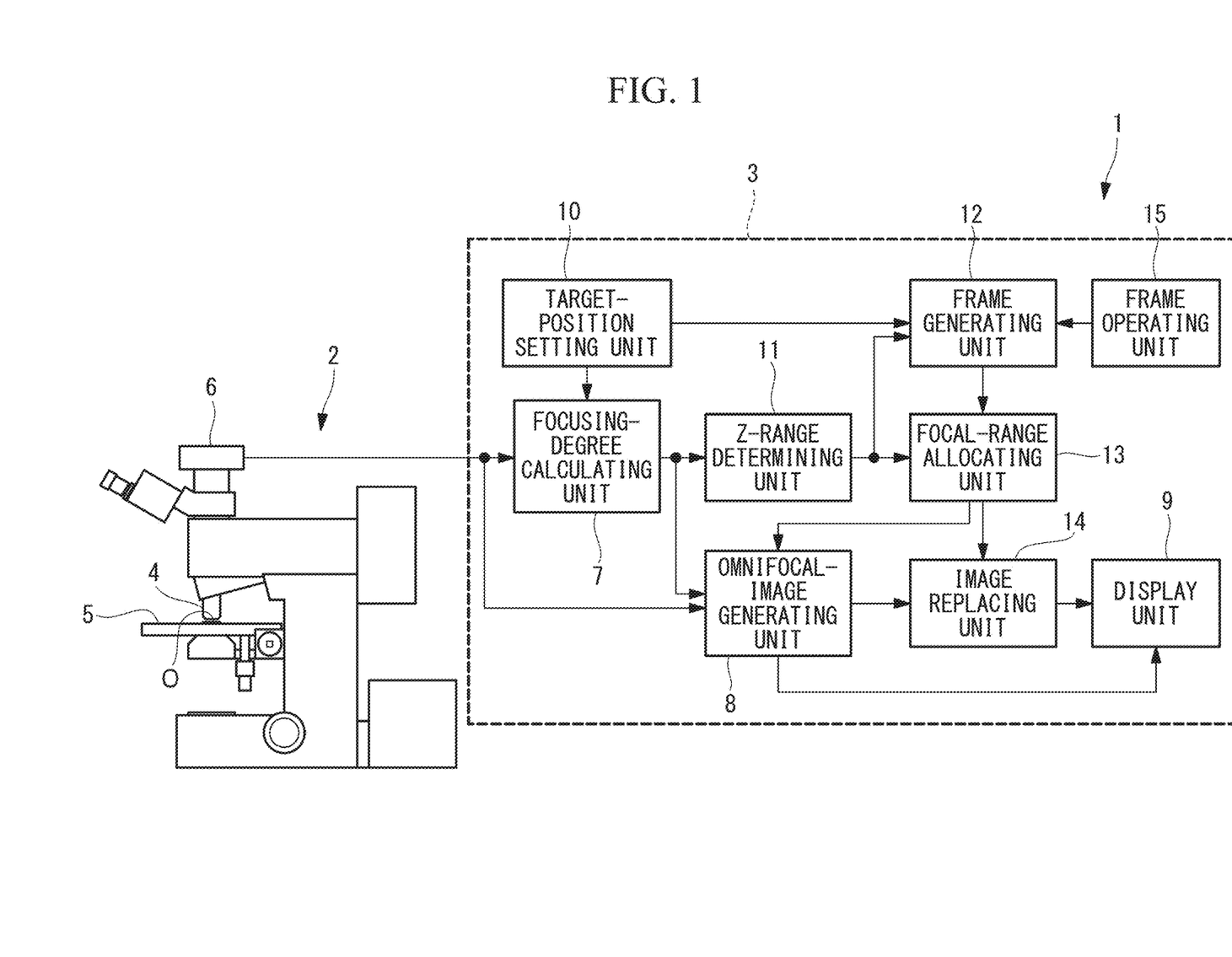
FIG. 1 is a block diagram showing an image observation device and a microscope system according to an embodiment of the present invention.

As shown in FIG. 1, the microscope system 1 according to this embodiment is provided with: a microscope 2 that acquires a Z-stack image constituted of a plurality of two-dimensional images of an imaging object O by shifting the focal position in the optical-axis direction of an objective lens 4; and the image observation device 3 for observing the Z-stack image acquired by the microscope 2.

The microscope 2 is provided with: a stage 5 on which the imaging object O is placed; the objective lens 4 that collects light coming from the imaging object O placed on the stage 5; and an image-acquisition unit 6 that captures an image of the light coming from the imaging object O and collected by the objective lens 4. Although the microscope 2 may be of an arbitrary type, the microscope 2 has a structure in which the relative positions of the objective lens 4 and the stage 5 can be changed in a direction along the optical axis of the objective lens 4, and it is possible to move the focal position of the objective lens 4, in the optical-axis direction thereof, with respect to the imaging object O.

The microscope 2 acquires a plurality of two-dimensional images while moving the focal position of the objective lens 4, in the optical-axis direction thereof, by minute distances with respect to the imaging object O, thereby acquiring a Z-stack image constituted of the plurality of acquired two-dimensional images.

As shown in FIG. 1, the image observation device 3 according to this embodiment is provided with: a focusing-degree calculating unit 7 to which the Z-stack image acquired by the microscope 2 is input and that calculates focusing degrees at each pixel position and generates a focusing-degree distribution; an omnifocal-image generating unit 8 that generates an omnifocal image on the basis of the generated focusing-degree distribution; and a display unit 9 that displays the generated omnifocal image.

In addition, the image observation device 3 is provided with: a target-position setting unit (position setting unit) 10 with which a user who has confirmed a target position on the omnifocal image displayed on the display unit 9 sets the target position on the omnifocal image; a frame generating unit 12 that generates a frame having a plurality of window portions on the basis of information about the set target position and information about focal ranges determined by a Z-range determining unit 11, which will be described later; a focal-range allocating unit 13 that allocates different focal ranges to the respective window portions of the generated frame; an image replacing unit 14 that replaces images in the window portions with omnifocal images generated, for the respective focal ranges, in the omnifocal-image generating unit (reference-image generating unit) 8; and a frame operating unit 15 for allowing the user to move the frame displayed on the display unit 9.

The focusing-degree calculating unit 7 generates a focusing-degree distribution for generating a reference image, which is an omnifocal image for the entire range of two-dimensional images constituting a Z-stack image, and a focusing-degree distribution at the pixel at the target position set by the target-position setting unit 10.

The focusing-degree calculating unit 7 utilizes, for example, a Laplacian pyramid capable of representing a high-frequency component, such as edge information, and calculates a focusing degree on the basis of the high-frequency component.

Figure 2:
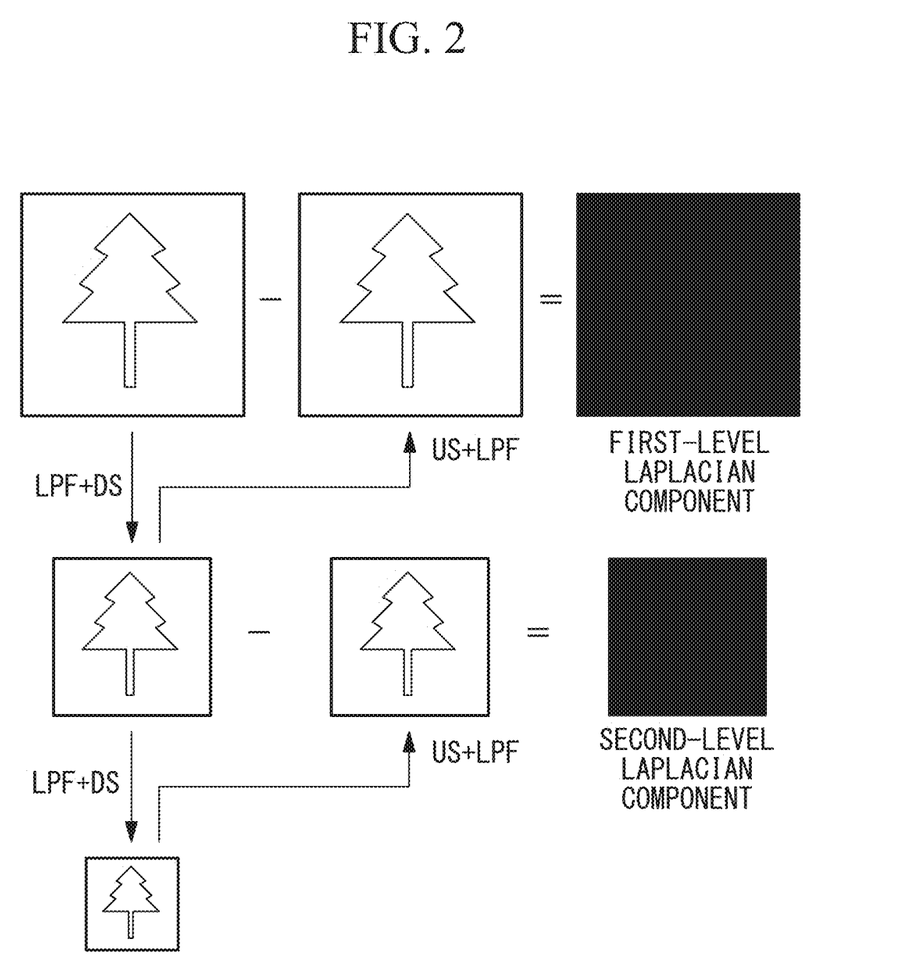
FIG. 2 is a diagram for explaining a Laplacian pyramid for calculating a focusing degree.

In general, a digital image can be decomposed into a low-frequency component (Gaussian component) and a high-frequency component (Laplacian component) and can be represented as pyramid levels due to correlations between resolutions. The high-frequency component can be represented as a level of a Laplacian pyramid. The Laplacian pyramid indicates a Laplacian component that is lost when a low-frequency component is obtained from an original image, and the frequency band differs depending on the level thereof. FIG. 2 shows an example of the Laplacian pyramid.

In FIG. 2, LPF indicates low-pass filtering, DS indicates downsampling, and US indicates upsampling.

In this embodiment, a four-level Laplacian pyramid is constructed, and a focusing degree is calculated on the basis of a second-level Laplacian component in which an edge component of the imaging object structure is considered to be stably included. FIG. 2 shows three levels among the four levels. Note that the level to be utilized need not be one arbitrary level, and Laplacian components in the individual bands may be blended with optimal weights on the basis of the observation conditions or the characteristics of the imaging object structure. In addition, the focusing-degree calculating method is not limited to the abovementioned method, and any known method, such as a calculating method based on a wavelet transform coefficient, may be employed.

Figure 3:
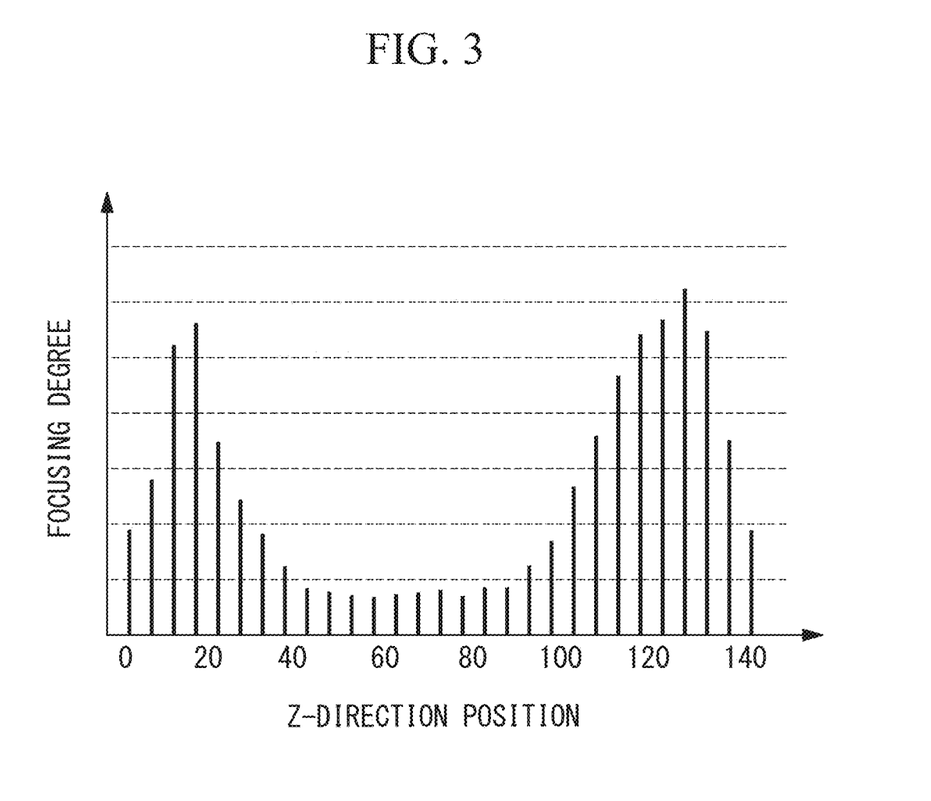
FIG. 3 is a diagram showing an example of a focusing-degree distribution that is generated by the image observation device in FIG. 1.

The focusing-degree calculating unit 7 arranges the focusing degrees calculated as described above according to Z-direction positions of the respective two-dimensional images, as shown in FIG. 3, thereby generating a focusing-degree distribution.

In the generation of a reference image, the focusing-degree calculating unit 7 generates focusing-degree distributions at all pixel positions of the two-dimensional images and sends the focusing-degree distributions to the omnifocal-image generating unit 8. When a target position is set by the target-position setting unit 10, the focusing-degree calculating unit 7 generates a focusing-degree distribution only at the pixel position at the set target position and sends the focusing-degree distribution to the Z-range determining unit 11.

The Z-range determining unit 11 detects focusing peaks having maximum focusing degrees in the focusing-degree distribution at the target position, said distribution having been sent from the focusing-degree calculating unit 7, and determines focal ranges, for each of the focusing peaks, for generating omnifocal images.

The detection of focusing peaks is performed in the Z-range determining unit 11 as described below.

Figure 4:
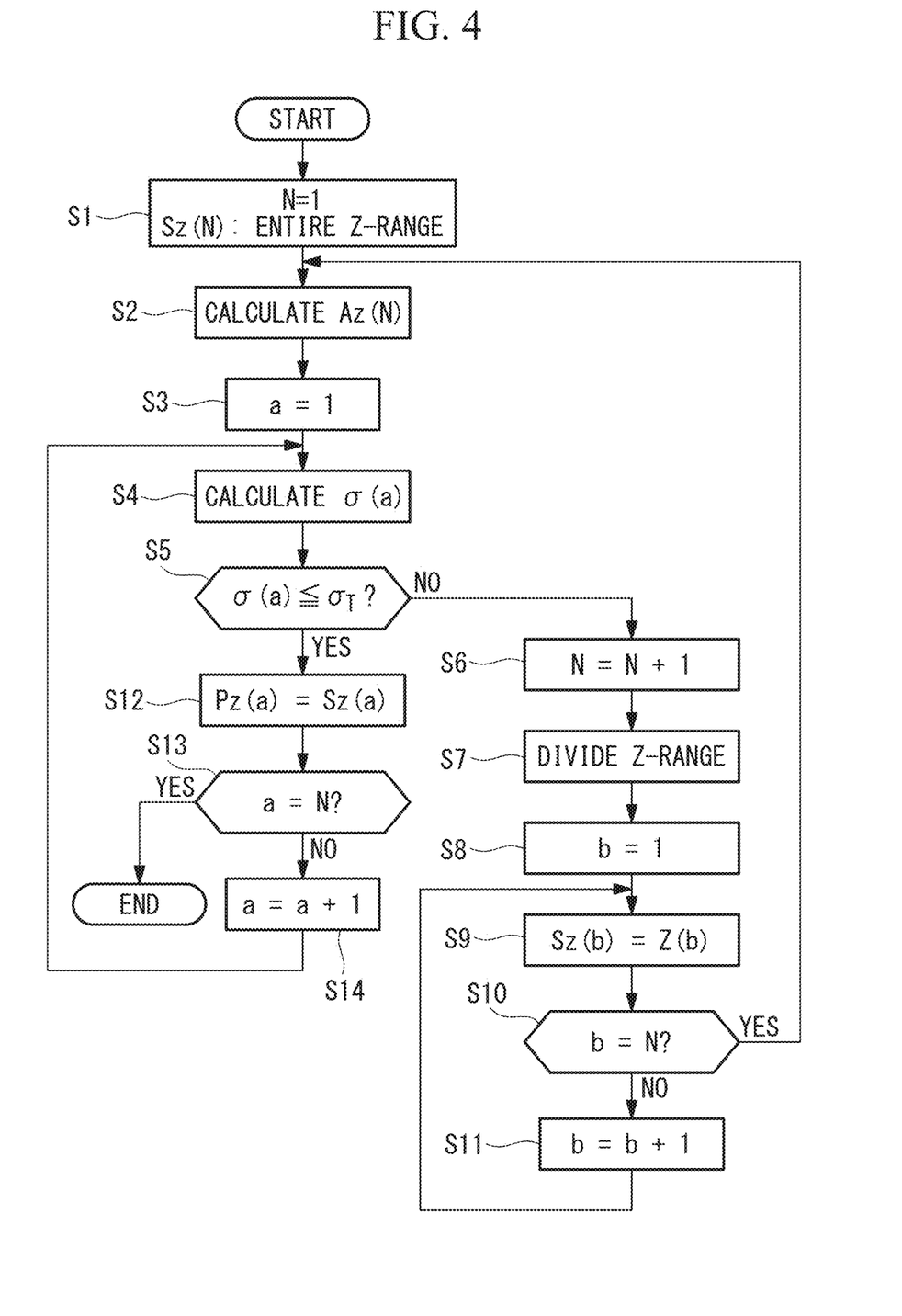
FIG. 4 is a flowchart for explaining a method of setting a detection range for focusing-degree peaks (hereinafter referred to as "focusing peaks") by means of the image observation device in FIG. 1.

First, as shown in FIG. 4, a focusing peak search range Sz is set.

In an initial state, a constant N is 1, and a search range Sz(N) is the entire Z-range (step S1). In the example shown in FIG. 3, the initial search range Sz(N) is 0 to 140.

Next, an analyzing target distribution Az(N) is obtained (step S2). Specifically, each focusing degree in the focusing-degree distribution is compared with a prescribed threshold, and only the focusing degrees greater than the threshold are included in the analyzing target distribution.

Then, a constant a is set to 1 (step S3), a variance value $\sigma(a)$ of the obtained analyzing target distribution Az(a) is calculated (step S4), and it is determined whether or not the variance value $\sigma(a)$ is less than or equal to a prescribed threshold $\sigma_T$ (step S5). In the case in which the variance value $\sigma$ is less than or equal to the prescribed threshold $\sigma_T$, it can be estimated that the number of focusing peaks is one or zero, and, in other cases, it can be estimated that the number of focusing peaks is two or more.

Therefore, in the case in which the number of focusing peaks is two or more, the constant N is incremented (step S6), the Z-range is divided into Z(N) (step S7), and search ranges Sz(N) are respectively reset to Z(N) (steps S8 to S11). Then, the processes from step S2 are repeated for each of the reset search ranges Sz(N).

Figure 5:
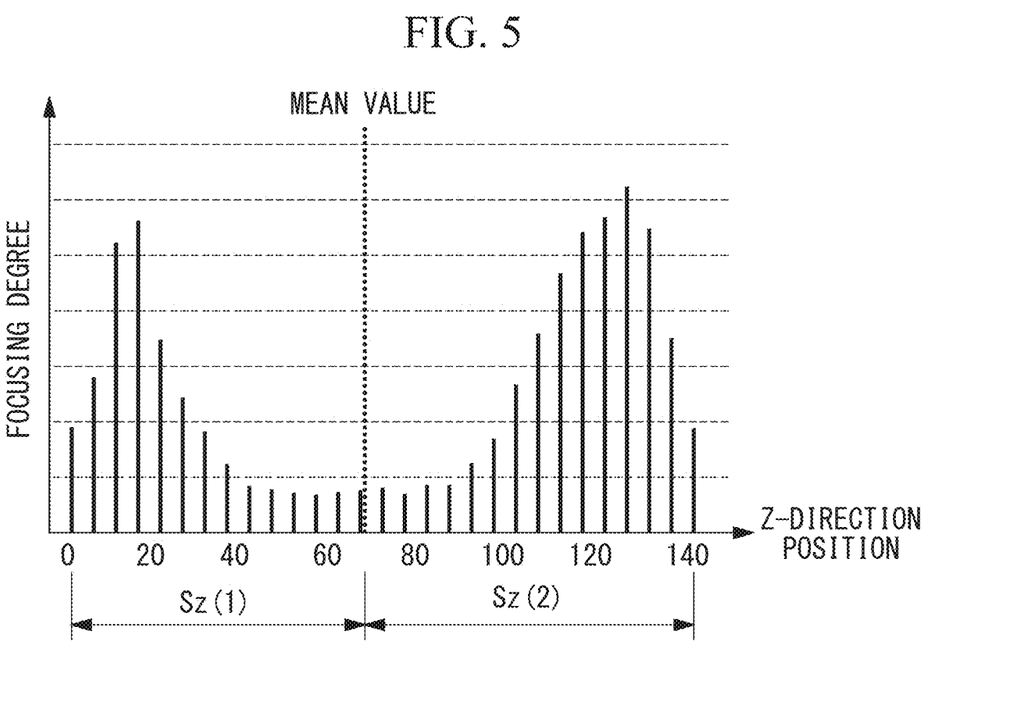
FIG. 5 is a diagram showing focusing peak search ranges, which are generated by dividing a Z-range in the flowchart in FIG. 4.

When dividing the Z-range, for example, as shown in FIG. 5, a mean value of the analyzing target distribution Az(N) may be set as a dividing position. In this case, the mean value is 66, and the reset search range Sz(1) and search range Sz(2) are 0 to 65 and 67 to 140, respectively.

The method of setting a dividing position is not limited to this method, and it is permissible to employ a method in which a peak detection function, such as the Fisher Distance, is created from the analyzing target distribution Az(N), and start points, midpoints, and end points of peaks are obtained on the basis of positive and negative changes in the value of the created peak detection function.

Meanwhile, in the case in which the number of focusing peaks is one or less, a search range Sz(a) is set as a detection range Pz(a) (steps S12 to S14), and the processes from step S4 are repeated until detection ranges Pz(N) are set for all search ranges Sz(N). In the figure, reference signs a and b indicate the constants.

Figure 6:
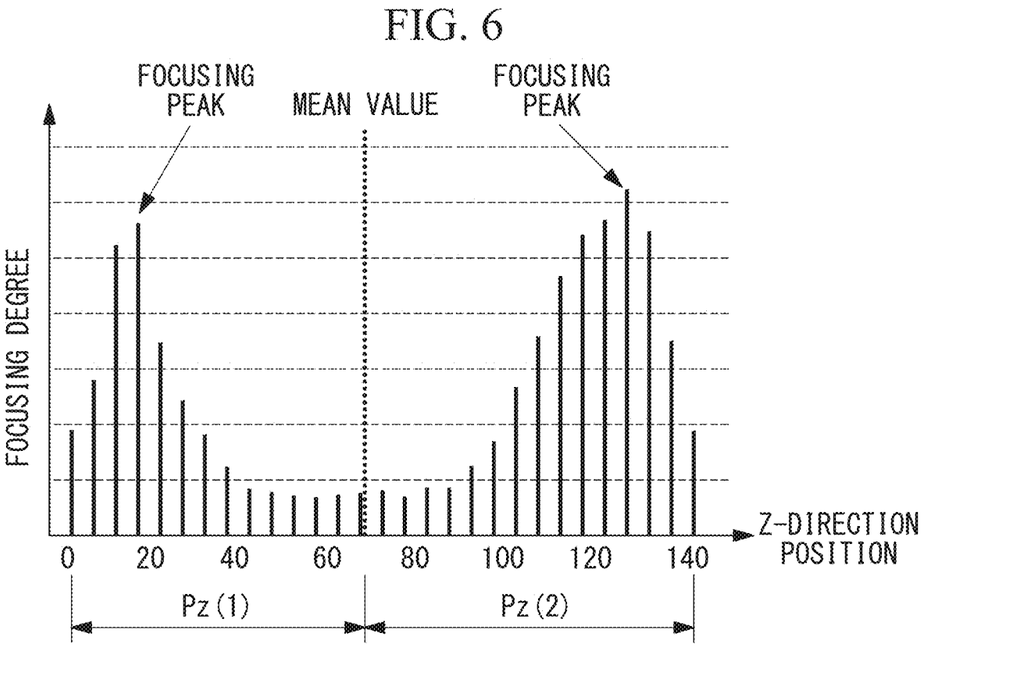
FIG. 6 is a diagram showing focusing peak detection ranges set in the flowchart in FIG. 4.

By doing so, the detection ranges Pz(N) in which the number of focusing peaks is zero or one are determined in all the search ranges Sz(N). FIG. 6 shows a case in which the number of focusing peaks is two in the entire Z-range, and two detection ranges Pz(1) and Pz(2) are determined.

Next, a Z-position of a focusing peak is detected in each of the detection ranges Pz(N). Here, a Z-position having the maximum focusing degree is detected as the focusing peak.

Furthermore, the Z-range determining unit 11 determines, for each of the detected focusing peaks, Z-ranges, in other words, focal ranges to be utilized for generation of omnifocal images.

Figure 7:
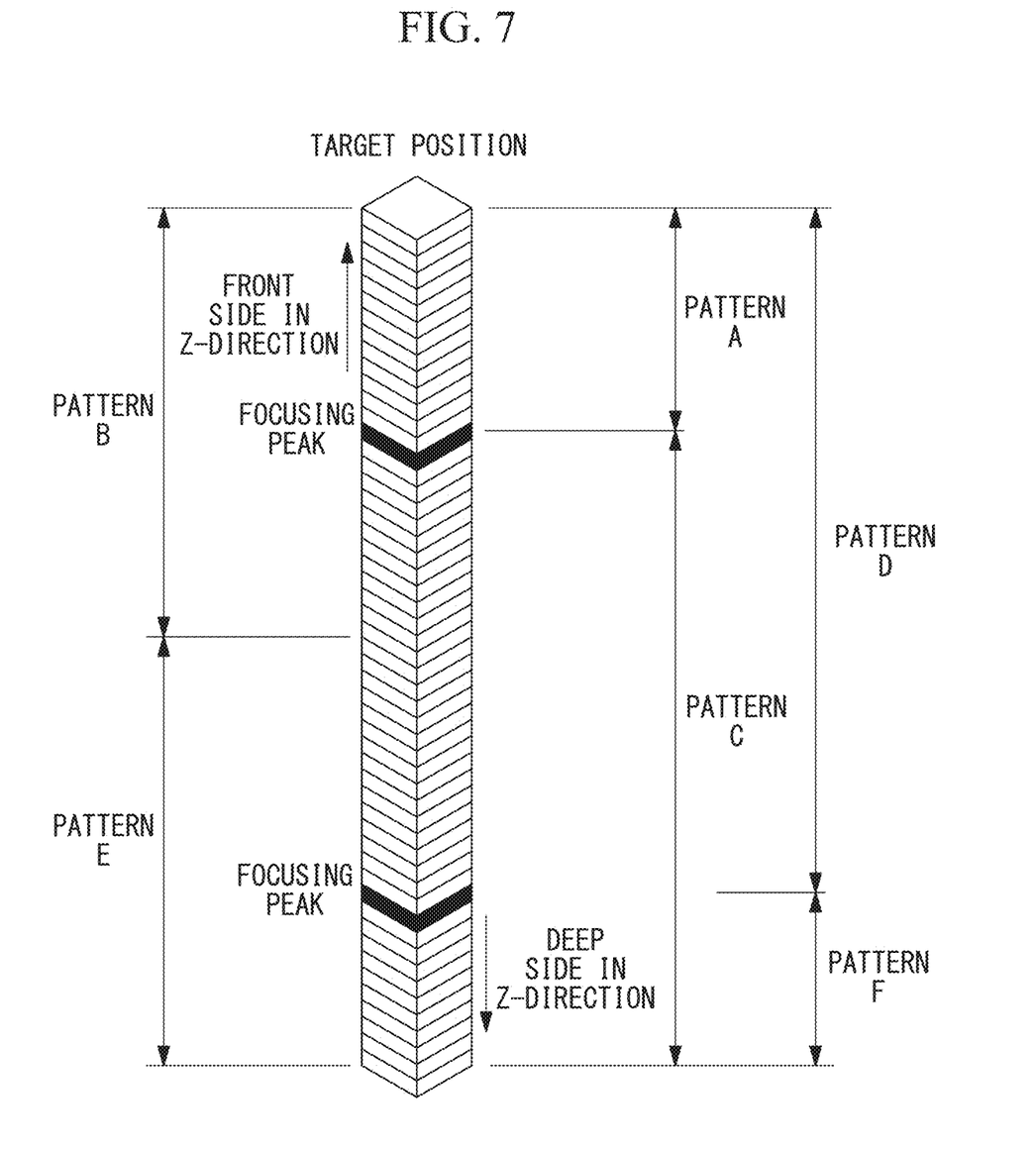
FIG. 7 is a schematic diagram showing an example of Z-ranges that are determined, for each focusing peak, by a Z-range determining unit of the image observation device in FIG. 1.

In FIG. 7, for example, three Z-ranges are determined, for each of the focusing peaks, as the Z-ranges to be utilized for generation of the omnifocal images; namely, the detection range (pattern B or E) of the focusing peak and two Z-ranges (patterns A and C or patterns D and F) on both sides of the focusing peak serving as a boundary.

When the omnifocal-image generating unit 8 receives, from the focusing-degree calculating unit 7, focusing-degree distributions at all pixel positions for generating a reference image, the omnifocal-image generating unit 8 selects, in each of the focusing-degree distributions, a pixel value of any two-dimensional image in the Z-direction, the image having the highest focusing degree, and generates an omnifocal image by combining the pixel values selected at all the pixel positions.

In addition, when the omnifocal-image generating unit 8 receives a plurality of Z-ranges from the Z-range determining unit 11, the omnifocal-image generating unit 8 generates omnifocal images for each focusing peak by using Z-stack images corresponding to the respective Z-ranges that are received. Although the method of generating an omnifocal image is basically the same as the method of generating a reference image, the methods differ in the Z-range and the pixel range of the two-dimensional images, the ranges being used for the image generation.

The target-position setting unit 10 is, for example, an input device, such as a mouse, for moving a cursor on an image displayed on the display unit 9 and sets a target position when the user moves the mouse and clicks on the target position of high interest.

In this embodiment, when the target-position setting unit 10 sets a target position and the Z-range determining unit 11 determines Z-ranges of Z-stack images that are used to generate omnifocal images for said target position, the frame generating unit 12 generates a frame to be displayed in a superimposed manner on the reference image.

Specifically, because the number of focusing peaks detected by the Z-range determining unit 11 is two, and three detection ranges are set for each of the focusing peaks, a frame having 2×3=6 window portions is generated.

Figure 8:
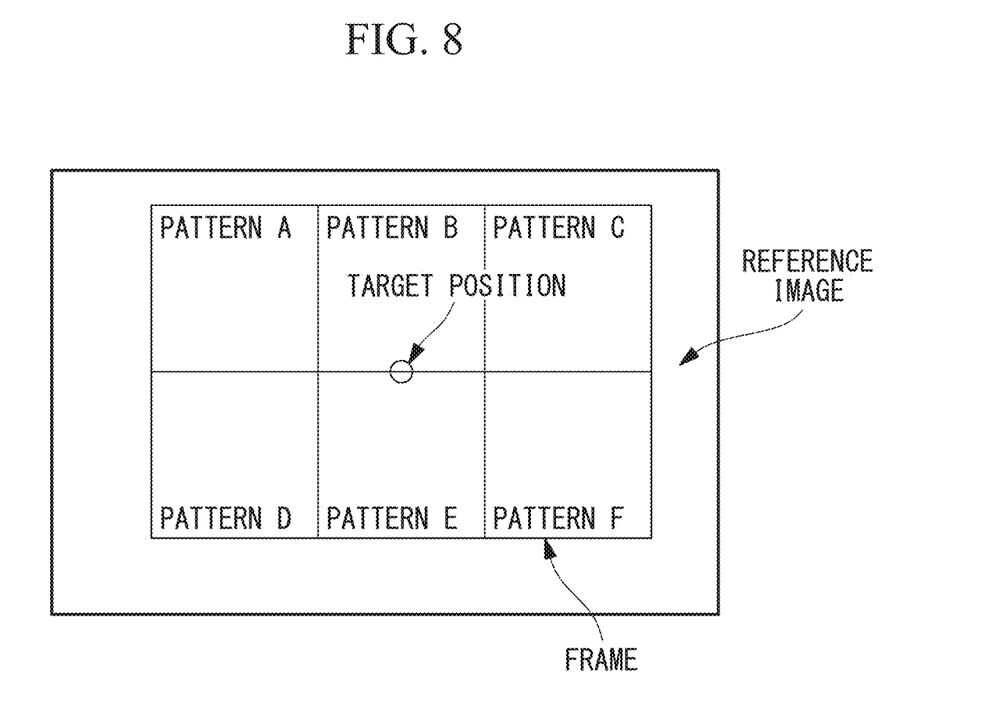
FIG. 8 is a diagram showing an example of a reference image and a frame that are displayed, in a superimposed manner, on a display unit of the image observation device in FIG. 1.

Then, for example, as shown in FIG. 8, the generated frame is displayed in a superimposed manner on the reference image on the display unit 9, with the center thereof located at the target position set by the target-position setting unit 10.

In addition, information about the generated frame is sent to the focal-range allocating unit 13. The focal-range allocating unit 13 allocates the six Z-ranges determined by the Z-range determining unit 11 to the respective window portions of the frame.

Specifically, the frame has, for example, the window portions of two rows and three columns; the two Z-ranges serving as the detection ranges are respectively allocated to the center window portions in the respective rows; the Z-ranges on the deep side of the focusing peaks in the depth direction are respectively allocated to the window portions in the left column; and the Z-ranges on the front side of the focusing peaks in the depth direction are respectively allocated to the window portions in the right column.

The omnifocal-image generating unit 8 receives the Z-stack images, the positional information of the window portions of the frame, and the information about the Z-ranges allocated to the respective window portions and generates, for respective small regions corresponding to the window portions, omnifocal images by using the Z-ranges allocated to the respective window portions. Then, the image replacing unit 14 replaces the small regions of the reference image, corresponding to the respective window portions, with the generated six omnifocal images, and the replaced images are displayed on the display unit 9.

In addition, the user can move the position of the frame that is displayed on the display unit 9 by means of the frame operating unit 15 constituted of, for example, an input unit, such as a mouse, and a GUI. When the frame is moved, the small regions corresponding to the respective window portions change, and thus, the omnifocal images are generated by using new positional information of the window portions and Z-ranges allocated to the window portions, thereby being updated.

The operation of the thus-configured image observation device 3 and microscope system 1 according to this embodiment will be described below.

Figure 9:
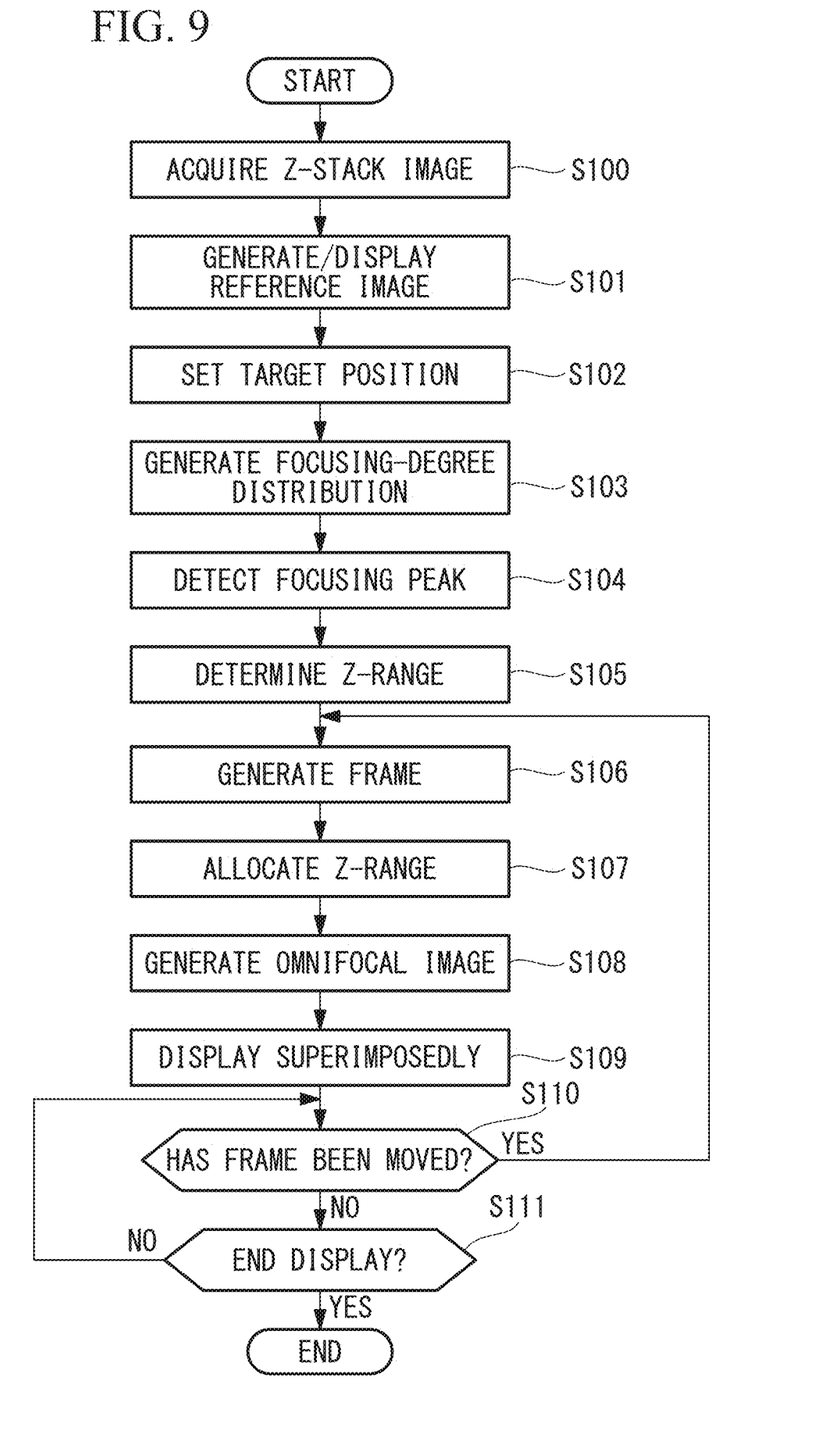
FIG. 9 is a flowchart for explaining a method of observing an image by means of the microscope system of the present invention.

To perform an observation of an imaging object O by using the microscope system 1 according to this embodiment, as shown in FIG. 9, the imaging object O is placed on the stage 5 of the microscope 2, and while the relative positions of the objective lens 4 and the stage 5 along the optical-axis direction of the objective lens 4 are changed by minutely moving the positions, a two-dimensional image of the imaging object O is acquired at each position and stored, whereby a Z-stack image is acquired (step S100).

The Z-stack image acquired in the microscope 2 is input to the image observation device 3.

In the image observation device 3, the focusing-degree calculating unit 7 generates a focusing-degree distribution over the entire range of the two-dimensional images constituting the Z-stack image and for each pixel position of the two-dimensional images, and the generated focusing-degree distributions are sent to the omnifocal-image generating unit 8.

The omnifocal-image generating unit 8 extracts, at each of the pixel positions, a pixel value of any two-dimensional image in the Z-direction, the image having the maximum focusing degree, on the basis of the input Z-stack image and the focusing-degree distributions at all the pixel positions, and generates an omnifocal image for the entire range of the two-dimensional images by combining the extracted pixel values, and the omnifocal image is displayed on the display unit 9 as a reference image (step S101).

The user looks at the reference image displayed on the display unit 9 and sets a target position of high interest (step S102). The coordinates of the set target position are sent to the focusing-degree calculating unit 7, and a focusing-degree distribution at said coordinates is generated (step S103).

The generated focusing-degree distribution is sent to the Z-range determining unit 11, and the Z-range determining unit 11 performs processing for setting focusing peak detection ranges, processing for detecting focusing peaks (step S104), and processing for determining Z-ranges for each of the detected focusing peaks (step S105). When the number of Z-ranges is determined in the Z-range determining unit 11, that information is sent to the frame generating unit 12, and a frame having as many window portions as the number of Z-ranges is generated (step S106).

Then, information about the generated frame is sent to the focal-range allocating unit 13, and the Z-ranges determined by the Z-range determining unit 11 are allocated to the respective window portions of the frame one by one (step S107).

In addition, the frame generating unit 12 calculates positions of the individual window portions on the reference image on the basis of the target position set by the target-position setting unit 10 so that the generated frame is displayed on the reference image, with the center thereof located at the target position set by the target-position setting unit 10.

The omnifocal-image generating unit 8 receives the Z-stack images input from the microscope 2, the positional information of the window portions of the frame, which has been sent from the focal-range allocating unit 13, and the information about the Z-ranges allocated to the respective window portions and generates, for respective small regions corresponding to the window portions, omnifocal images from the Z-stack images by using the information about the Z-ranges allocated to the window portions (step S108).

Figure 10:
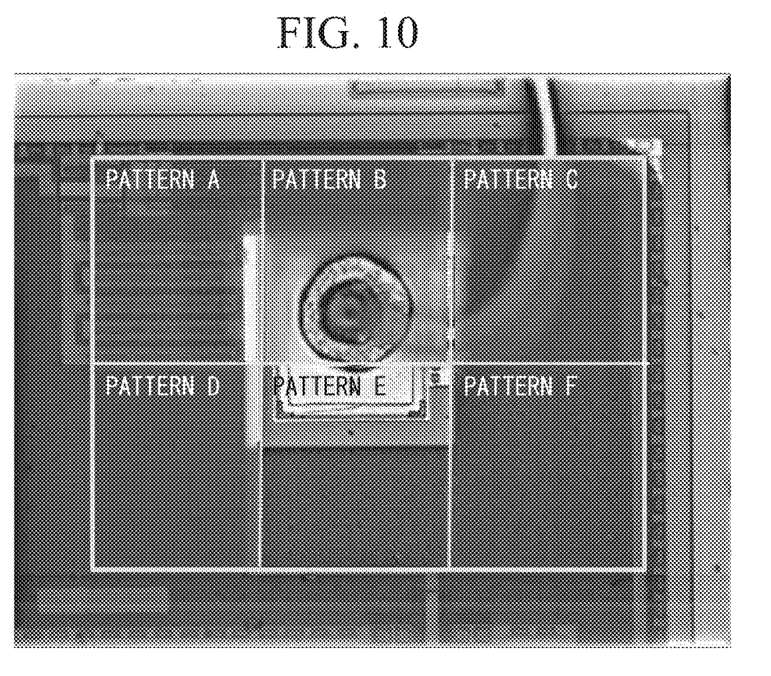
FIG. 10 is a diagram showing an actual display example of the image and the frame that are displayed on the display unit of the image observation device in FIG. 1.

Then, the image replacing unit 14 employs the omnifocal images generated for the respective window portions as the images in the window portions of the frame, the frame is superimposed on the reference image, and an image in which the omnifocal images having different Z-ranges are employed in the respective window portions of the frame is displayed on the display unit 9 (step S109). FIG. 10 shows an actual display example.

Figure 11:
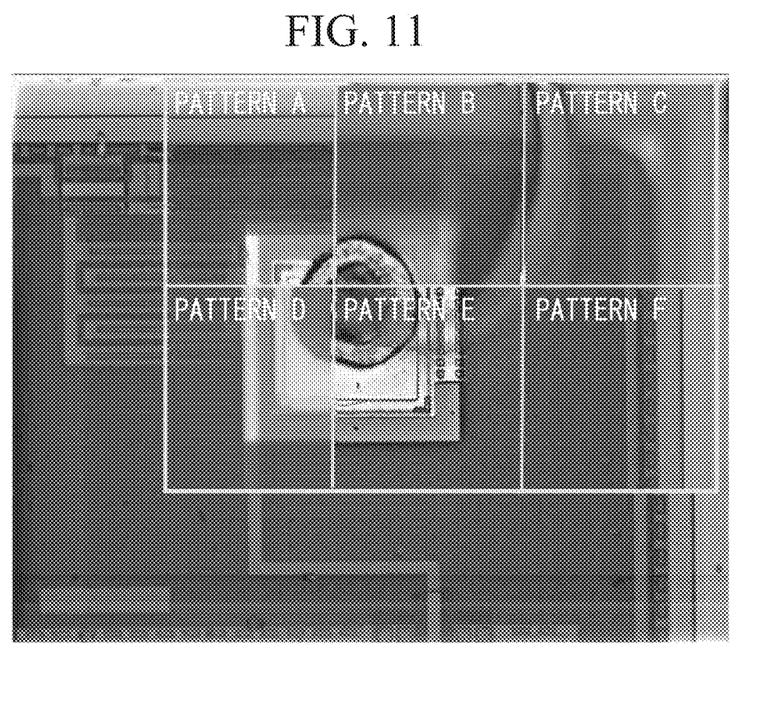
FIG. 11 is a diagram showing a state in which the frame is moved in the display example in FIG. 10.

The user can move the frame with respect to the reference image by grabbing the frame that is displayed on the display unit 9 and dragging the frame by operating the frame operating unit 15 provided with a mouse. When the frame is moved, the positions of the individual window portions change; thus, it is determined whether or not the frame has been moved (step S110) and, in a case in which the frame has been moved, the focal-range allocating unit 13 sends new positional information of the window portions to the omnifocal-image generating unit 8, and the omnifocal images are re-generated and updated (steps S106 to S109). FIG. 11 shows an actual display example in the case in which the frame is moved.

In a case in which the frame is not moved and the display is ended (step S111), the processing is ended.

As described above, with the image observation device 3 and the microscope system 1 according to this embodiment, a user can freely move a frame that is displayed in a superimposed manner on a reference image on the display unit 9 and, by simply matching any of the window portions that are defined by the frame with a target position, can perform an observation at the target position by means of omnifocal images for Z-ranges that are allocated to said window portions. As a result, there is an advantage in that it is possible to observe the structure of an imaging object O in the depth direction in a more intuitive manner without switching the entire image or comparing images that are displayed side-by-side.

In particular, because three Z-ranges are prepared as the Z-ranges, namely, each detection range including a focusing peak and Z-ranges on both sides of the focusing peak serving as a boundary, by using the omnifocal images for the detection ranges including the focusing peaks, it is possible to grasp the overall image of a characteristic structure, which is focused in the target region, and by using the omnifocal images for the Z-ranges on both sides of the focusing peaks, it is possible to observe structures on the deep side and the front side of the characteristic structure in the depth direction by readily switching the images thereof.

In addition, by using the omnifocal images for the Z-ranges excluding detection ranges including other focusing peaks, it is possible to prevent the structure at the focusing peak from becoming less recognizable due to information about other unnecessary Z-stack images. In addition, with the omnifocal images for which the Z-ranges matching with the detection ranges are used, because the omnifocal images are for the limited ranges centered on the focusing peaks, there is an advantage in that it becomes easier to grasp the structure in a region that needs to be observed in particular.

In addition, in this embodiment, because the reference image formed of the omnifocal image for which the entire Z-range is used is displayed outside the frame, the user can perform the observation at the target position while grasping the surrounding structure with the reference image.

Note that, although the omnifocal image for which the entire Z-range is used has been illustrated as an example of the reference image to be displayed on the display unit 9 in this embodiment, the reference image is not limited thereto, and any image may be employed as the reference image as long as the image indicates the observation range of the imaging object O. For example, any one of the two-dimensional images constituting the Z-stack image may be employed, or an image in which two or more two-dimensional images are combined may be employed as the reference image.

In addition, although the target-position setting unit 10 with which the user sets the target position by means of a mouse has been illustrated as an example in this embodiment, alternatively, a characteristic region of the imaging object O may be automatically acquired by means of image recognition processing or the like, and the acquired region may be set as the target position. In addition, although one pixel on the reference image is set as the target position in this embodiment, alternatively, a region having an arbitrary size may be set in accordance with the size of the structure to be observed.

In this case, a focusing-degree distribution may be obtained by adding the focusing-degree distributions corresponding to the respective pixel positions in the set region. By doing so, it is possible to perform an observation by means of omnifocal images for Z-ranges determined for each of main focusing peaks in the region having an arbitrary size.

In addition, at a position where a texture is not present and the accuracy of focusing degrees is low, all focusing degrees in the Z-direction are smaller than the threshold and it is not possible to detect any focusing peak. For such a position, a pixel value at an arbitrary Z-direction position may be set. The arbitrary Z-direction position may be specified in advance on the basis of the characteristics of the imaging object O. For example, in a case in which the imaging object O is a biological object, a user may specify a Z-position at which a background region is present and, in a case in which the imaging object O is an industrial object, the user may specify a Z-position at which a bottom surface region or the like is present. The arbitrary Z-direction position may be set to the lowest position in the structure of the imaging object O, an image-capturing start position, or an image-capturing end position.

In addition, although the frame that includes the rectangular window portions having the same size has been illustrated as an example in this embodiment, the frame is not limited thereto, and a frame that includes window portions having different shapes and sizes may be employed. In addition, the size of the window portions may be changed by being manipulated by a user. In addition, the Z-ranges determined by the Z-range determining unit 11 are not limited to the above, and the number and ranges of Z-ranges can be arbitrarily set.

In addition, the Z-range matching with the detection range may be determined in a more limited manner. For example, a standard deviation may be calculated for the detection range in which the focusing peak is detected, and the range of 2× standard deviation, which is centered on the focusing peak, may be determined as the Z-range.

Figure 12:
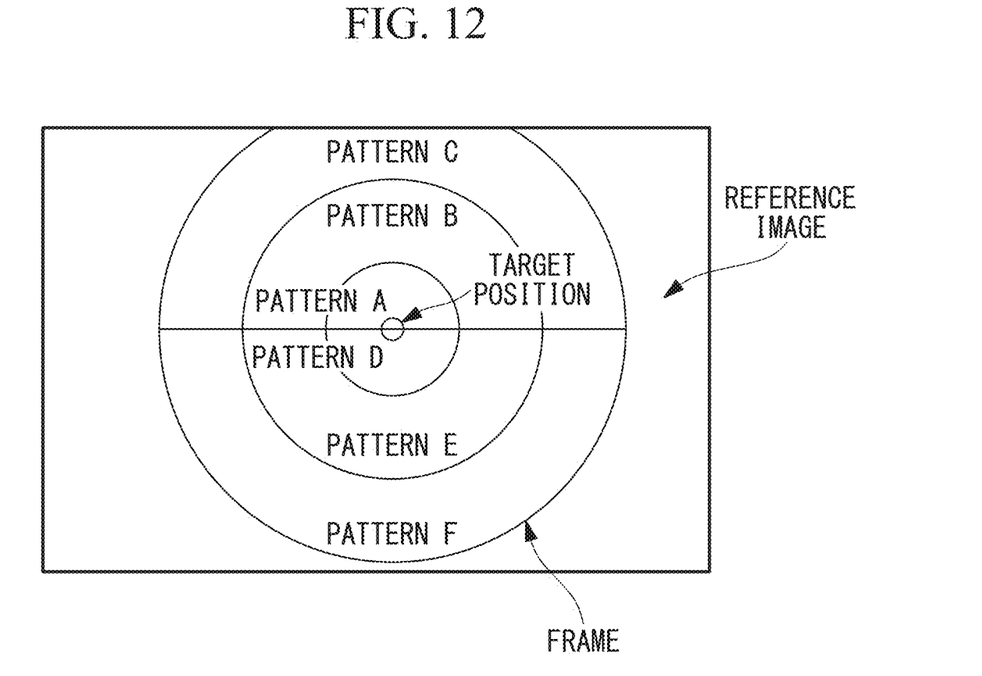
FIG. 12 is a diagram showing a modification of the frame in the image observation device in FIG. 1.

In addition, the window portions of the frame are not limited to the rectangles and, as shown in FIG. 12, the window portions may be formed of concentric circles or the like.

In addition, although the Z-ranges are determined by the Z-range determining unit 11 on the basis of the focusing-degree distribution at the set target position in this embodiment, alternatively, a plurality of Z-ranges may be stored in advance, and said Z-ranges may be used.

As a result, the above-described embodiment leads to the following aspects.

An aspect of the present invention is an image observation device provided with: a reference-image generating unit that generates a reference image on the basis of one or more two-dimensional images of a Z-stack image constituted of the plurality of two-dimensional images that are acquired by shifting a focal position in an optical-axis direction of an objective lens; a frame generating unit that generates, on the reference image generated by the reference-image generating unit, a frame that has a plurality of window portions covering different small regions of the reference image and that is superimposed on the reference image; a frame operating unit with which the frame generated by the frame generating unit is operated so as to be moved with respect to the reference image; a focal-range allocating unit that allocates different focal ranges to the respective window portions of the frame generated by the frame generating unit; an omnifocal-image generating unit that generates, for the respective small regions covered by the respective window portions, omnifocal images by using, among the two-dimensional images in regions corresponding to the respective small regions, the two-dimensional images in the focal ranges allocated to the respective window portions by the focal-range allocating unit; an image replacing unit that replaces the regions of the reference image in the respective window portions with the respective omnifocal images that are generated by the omnifocal-image generating unit and that are based on the different focal ranges; and a display unit that displays the reference image, the frame, and the omnifocal images.

With this aspect, when the Z-stack image is input, the reference image is generated by the reference-image generating unit and displayed on the display unit, and, in addition, the frame that has the plurality of window portions covering the different small regions of the reference image is generated by the frame generating unit and displayed on the display unit by being superimposed on the reference image. The omnifocal-image generating unit generates the omnifocal images by using the two-dimensional images in the different focal ranges allocated to the respective window portions by the focal-range allocating unit, the image replacing unit replaces the regions of the reference image in the respective window portions with the omnifocal images generated in correspondence to the respective window portions, and the replaced images are displayed.

When a user changes the small regions corresponding to the respective window portions by moving the frame on the reference image that is displayed on the display unit by operating the frame operating unit, omnifocal images corresponding to the respective small regions are newly generated, and the omnifocal images are replaced by the image replacing unit. With this configuration, the user can observe a target region by switching the omnifocal images in the different focal ranges by simply changing the window portions that cover the target region by moving the frame.

In other words, comparing with a case in which an observation is performed by switching a plurality of omnifocal images or by displaying the omnifocal images side-by-side, it is possible to switch the focal ranges without shifting the eyes from the vicinity of the target region, and it is possible to intuitively grasp the structure of an imaging object in the depth direction.

In the abovementioned aspect, a position setting unit that sets any one of pixel positions on the reference image that is generated in the reference-image generating unit and that is displayed on the display unit; a focusing-degree calculating unit that generates a focusing-degree distribution by calculating a focusing degree in each of the two-dimensional images of the Z-stack image at the pixel position set by the position setting unit; and a Z-range determining unit that determines a plurality of patterns of focal ranges on the basis of the focusing-degree distribution generated by the focusing-degree calculating unit may be further provided, and the focal-range allocating unit may allocate the respective focal ranges determined by the Z-range determining unit to the different window portions.

By doing so, when the user sets any one of the pixel positions, by means of the position setting unit, on the reference image that is displayed on the display unit, the focusing-degree calculating unit calculates the focusing degrees at the set pixel position and generates the focusing-degree distribution. Because the Z-range determining unit determines the plurality of focal ranges on the basis of the generated focusing-degree distribution, it is possible to observe the target region of the imaging object by means of the omnifocal images in the vicinity of a focal point having a high focusing degree.

In addition, in the abovementioned aspect, the reference image may be an omnifocal image that is generated by using the two-dimensional images in a focal range larger than all of the focal ranges to be allocated by the focal-range allocating unit.

By doing so, in the display unit on which the omnifocal image generated by using the two-dimensional images in the largest focal range is displayed as the reference image, the focal ranges of the target region are switched by moving the frame; thus, it is possible to observe the target region while constantly checking the overall image of the imaging object. By doing so, it is possible to grasp the structure in the target region in the depth direction, with respect to the overall image of the imaging object, in a more intuitive manner.

In addition, another aspect of the present invention is a microscope system provided with: a microscope that acquires the Z-stack image; and any one of the abovementioned image observation devices.

The present invention affords an advantage in that it is possible to intuitively and comprehensibly observe the structure, in the depth direction, of an imaging object having a plurality of foci in the depth direction.

REFERENCE SIGNS LIST 1 microscope system
2 microscope
3 image observation device
4 objective lens
7 focusing-degree calculating unit
8 omnifocal-image generating unit (reference-image generating unit)
9 display unit
10 target-position setting unit (position setting unit)
11 Z-range determining unit
12 frame generating unit
13 focal-range allocating unit
14 image replacing unit
15 frame operating unit

The invention claimed is:

1. An image observation device configured to:
perform a reference-image generating that generates a reference image on a basis of one or more two-dimensional images of a Z-stack image constituted of the plurality of two-dimensional images that are acquired by shifting a focal position in an optical-axis direction of an objective lens;
perform a frame generating that generates, on the generated reference image, a frame that has a plurality of window portions covering different small regions of the reference image and that is superimposed on the reference image;
perform a frame operating that allows a user to operate the generated frame so as to be moved with respect to the reference image;
perform a focal-range allocating that allocates different focal ranges to the respective window portions of the generated frame;
perform an omnifocal-image generating that generates, for the respective small regions covered by the respective window portions, omnifocal images by using, among the two-dimensional images in regions corresponding to the respective small regions, the two-dimensional images in the focal ranges allocated to the respective window portions;
perform an image replacing that replaces the regions of the reference image in the respective window portions with the respective generated omnifocal images that are based on the different focal ranges; and
display the reference image, the frame, and the omnifocal images.

2. An image observation device according to claim 1, being further configured to:
perform a position setting that sets any one of pixel positions on the generated displayed reference image;
perform a focusing-degree calculating that generates a focusing-degree distribution by calculating a focusing degree in each of the two-dimensional images of the Z-stack image at the set pixel position; and
perform a Z-range determining that determines a plurality of patterns of focal ranges on a basis of the generated focusing-degree distribution,
wherein, in the focal-range allocating, the respective determined focal ranges are allocated to the different window portions.

3. An image observation device according to claim 1, wherein the reference image is an omnifocal image that is generated by using the two-dimensional images in a focal range larger than all of the focal ranges to be allocated.

4. A microscope system comprising:
a microscope that acquires the Z-stack image; and
an image observation device according to claim 1.

* * * * *